July 19, 1927.  G. VAN D. CORNELL  1,636,216
PUZZLE
Filed Aug. 3, 1926
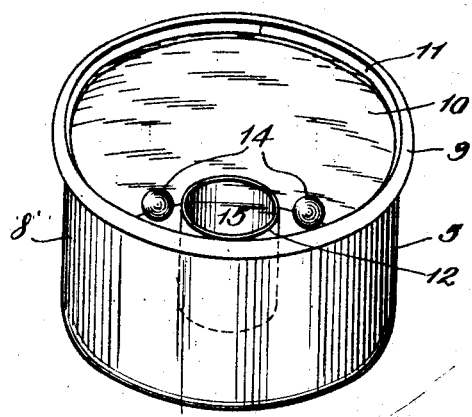
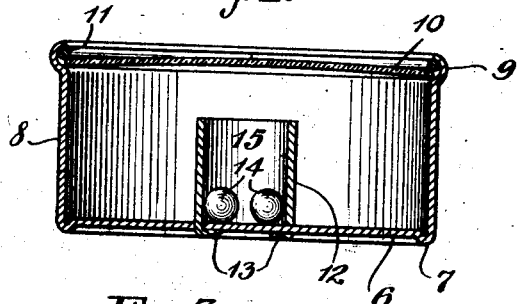
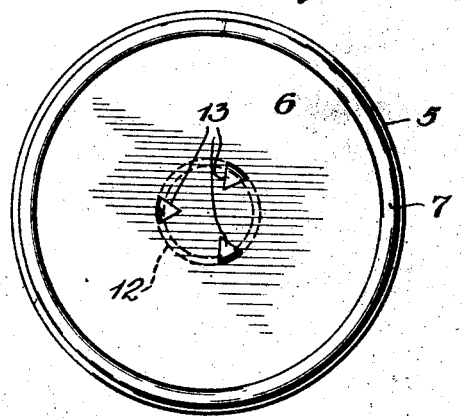
INVENTOR
George V. Cornell
BY
ATTORNEY Patented July 19, 1927.

1,636,216

UNITED STATES PATENT OFFICE.

GEORGE VAN DUYN CORNELL, OF BOUNDBROOK, NEW JERSEY.

PUZZLE.

Application filed August 3, 1926. Serial No. 126,768.

This invention relates to puzzle devices, and the object of the invention is to provide a device of this class comprising a cup-shaped body having a transparent closure for the top thereof and a small cup or tubular member within said body substantially centrally thereof, and one or more movable members disposed in the cup-shaped body and adapted to be placed in said receptacle by the manipulation of the puzzle device, the top of said receptacle being in spaced relation with the transparent closure of the cup-shaped body to permit of the passage of the members into said receptacle; and with this and other objects in view, the invention consists in a puzzle device of the class specified which is simple in construction, intricate in solution and designed to amuse both young and old, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a perspective view of a puzzle device made according to my invention.

Fig. 2 is a transverse section of the device seen in Fig. 1, showing the solution of the puzzle; and, Fig. 3 is a bottom plan view of the device.

In practice, I provide a suitable casing 5 in the form of a cup-shaped body which may be constructed of any suitable material and in any desired manner. In the construction shown, the casing 5 comprises a bottom 6 set upwardly to form an annular body 7 around the periphery of the bottom 6. The upstanding walls 8 of the casing, in the construction shown, are circular in form and terminate in an outwardly and inwardly bent rim 9 forming a seat for a transparent closure 10 which is held in position, in the construction shown, by a split ring 11.

The bottom 6 and side walls 8 of the casing 5 are integral, but my invention is not limited to this manner of construction, and further, the transparent closure member 10 may be composed of glass, celluloid, isinglass or other suitable material, and may be retained in position in any desired manner.

Mounted centrally of the bottom 6 of the casing 5 is a comparatively small receptacle 12 in the form of a tube, the lower end of which is provided with projecting prongs 13 adapted to be passed downwardly through the bottom 6 of the casing 5 and crimped over to fixedly secure the receptacle in position, the bottom of the receptacle 12 being formed by the bottom 6 of the casing 5 as will be apparent. The upper end of the receptacle 12 terminates inwardly of and in spaced relation with the closure 10, the space being sufficient to permit of the passage of movable members 14 into the chamber 15 of the receptacle 12.

The members 14 in the construction shown are in the form of balls or spherical bodies which are normally disposed in the casing 5 proper as seen in Fig. 1 of the drawing. In the solution of the puzzle, both of said members must be placed in the chamber 15 of the receptacle 12 by the manipulation of the puzzle device. It will be understood that the size of the chamber 15 as compared with the size of the balls 14 will control and regulate the simplicity or difficulty in the solution of the puzzle, as will also the number of members 14 employed, it being understood that two or more of these members may be used.

It will be understood that my invention is not necessarily limited to a casing of any particular shape or form nor am I limited to the shape or form of the members 14, and various other changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A puzzle device comprising a cup-shaped casing of unitary construction, the upper ends of the walls of the casing having a beaded rim, a transparent panel secured within the rim of said casing, a tubular member provided at one end with projecting prongs adapted to be passed through apertures in the bottom of the casing, and crimped onto the lower face of said bottom to couple said tubular member with the casing and support the same within the chamber thereof, and a plurality of members movably disposed in the chamber of the casing and adapted to be placed in said tubular member in the solution of the puzzle.

2. A puzzle device comprising a cup-shaped casing of unitary construction, the upper ends of the walls of the casing having a beaded rim, a transparent panel secured within the rim of said casing, a tubular member provided at one end with projecting prongs adapted to be passed through apertures in the bottom of the casing, and crimped onto the lower face of said bottom to couple said tubular member with the casing and support the same within the chamber thereof, a plurality of members movably disposed in the chamber of the casing and adapted to be placed in said tubular member in the solution of the puzzle, and the bottom of the casing being set inwardly to form a unitary bead at the lower ends of the walls of the casing.

3. A puzzle device comprising a casing having bottom and side walls, a tubular member provided at one end with projecting prongs adapted to be passed through apertures in the bottom of the casing, and crimped onto the lower face of the bottom to couple said tubular member therewith and support the same within the chamber of the casing, and a member movably disposed in the chamber of the casing and adapted to be placed in said tubular member, in the solution of the puzzle.

In testimony that I claim the foregoing as my invention I have signed my name this 30th day of July 1926.

GEORGE VAN DUYN CORNELL.